United States Patent
Blevis et al.

(10) Patent No.: US 9,784,854 B2
(45) Date of Patent: Oct. 10, 2017

(54) DIRECT CONVERSION RADIATION DETECTOR DIGITAL SIGNAL PROCESSING ELECTRONICS

(71) Applicant: KONINKLIJKE PHILIPS N.V., Eindhoven (NL)

(72) Inventors: Ira Micah Blevis, Zichron (IL); Daniel Rubin, Haifa (IL); Oren Zarchin, Raanana (IL); Frank Verbakel, Helmond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/889,932

(22) PCT Filed: Apr. 30, 2014

(86) PCT No.: PCT/IB2014/061103
§ 371 (c)(1),
(2) Date: Nov. 9, 2015

(87) PCT Pub. No.: WO2014/181223
PCT Pub. Date: Nov. 13, 2014

(65) Prior Publication Data
US 2016/0084968 A1 Mar. 24, 2016

Related U.S. Application Data
(60) Provisional application No. 61/821,909, filed on May 10, 2013.

(51) Int. Cl.
G01T 1/24 (2006.01)
G01T 1/29 (2006.01)
(Continued)

(52) U.S. Cl.
CPC ............... G01T 1/24 (2013.01); G01T 1/18 (2013.01); G01T 1/247 (2013.01); G01T 1/2928 (2013.01);
(Continued)

(58) Field of Classification Search
CPC ...................................................... G01T 1/24
See application file for complete search history.

(56) References Cited

U.S. PATENT DOCUMENTS

| 4,709,559 A | 12/1987 | Dotzauer et al. |
| 6,337,894 B1 | 1/2002 | Tybinkowski et al. |

(Continued)

FOREIGN PATENT DOCUMENTS

| DE | 102004048962 | 4/2006 |
| EP | 01092206 | 5/1984 |

(Continued)

OTHER PUBLICATIONS

Dirk Meier, et al., "Interpolation in a pixellated CZT—radiation detector", Nuclear Science Symposium and Medical Imaging Conference (NSS/MIC), 2011 IEEE, Oct. 23, 2011, pp. 4550-4556.

(Continued)

*Primary Examiner* — David Porta
*Assistant Examiner* — Hugh H Maupin (57) ABSTRACT

A system (100) includes a photon counting detector array (116) including a direct conversion material (118) and a plurality of detector pixels (120) affixed thereto, and a split signal corrector (126) that corrects the output of the plurality of detector pixels for split signals. A method includes receiving an output signal of each of a plurality of detector pixels affixed to a direction conversion material of photon counting detector array, and correcting the output of the plurality of detector pixels for split signals. A computer readable storage medium encoded with computer readable (Continued)

instructions, which, when executed by a processer, cause the processor to: receive an output signal of each of a plurality of detector pixels affixed to a direction conversion material of photon counting detector array, and correct the output of the plurality of detector pixels for split signals.

21 Claims, 5 Drawing Sheets

(51) Int. Cl.
*G01T 1/18* (2006.01)
*H04N 5/32* (2006.01)
*H04N 5/357* (2011.01)
*H04N 5/378* (2011.01)

(52) U.S. Cl.
CPC ............... *H04N 5/32* (2013.01); *H04N 5/357* (2013.01); *H04N 5/378* (2013.01)

(56) References Cited

U.S. PATENT DOCUMENTS

| | | | |
|---|---|---|---|
| 2004/0057556 | A1 | 3/2004 | Luhta et al. |
| 2007/0007457 | A1* | 1/2007 | Blevis ............... G01T 1/2018 250/370.09 |
| 2007/0051893 | A1* | 3/2007 | Matsumoto ............ 250/370.01 |
| 2007/0076848 | A1* | 4/2007 | Walter et al. ............... 378/98.8 |
| 2009/0114829 | A1* | 5/2009 | He .......................... G01T 1/247 250/370.01 |
| 2009/0168948 | A1 | 7/2009 | Luo et al. |
| 2010/0195949 | A1 | 8/2010 | Yagi et al. |
| 2012/0025062 | A1 | 2/2012 | Neubauer et al. |
| 2012/0027163 | A1 | 2/2012 | Mochitate |
| 2012/0104262 | A1* | 5/2012 | Wiegert ............... G01N 23/046 250/363.03 |
| 2012/0262322 | A1 | 10/2012 | Kelly et al. |
| 2012/0305786 | A1* | 12/2012 | Dierickx ...................... 250/371 |

FOREIGN PATENT DOCUMENTS

| | | |
|---|---|---|
| EP | 2541280 | 1/2013 |
| WO | 9919882 | 4/1999 |
| WO | 2004/064168 | 7/2004 |
| WO | 2012031684 | 3/2013 |

OTHER PUBLICATIONS

Ballabriga, et al., "The Medipix3 Prototype, a Pixel Readout Chip Working in Single Photon Counting Mode with Improved Spectrometric Performance", IEE Transactions on Nuclear Science, IEEE Service Center, New York, vol. 54, No. 5, Oct. 1, 2007, pp. 1824-1829.

Sordo, et al., "Progress in the Development of CdTe and CdZnTe Semiconductor Radiation Detectors for Astrophysical and Medical Applications", Sensors, 2009, 9, 3491-3526.

Farr, et al., GigaHertz Bandwidth Photon Counting:, Advanced Photon Counting Techniques III, Vole 7320, 732006, 2009.

\* cited by examiner

DIRECT CONVERSION RADIATION DETECTOR DIGITAL SIGNAL PROCESSING ELECTRONICS

CROSS-REFERENCE TO PRIOR APPLICATIONS

This application is the U.S. National Phase application under 35 U.S.C. §371 of International Application No. PCT/IB2014/061103, filed on Apr. 30, 2014, which claims the benefit of U.S. Patent Application No. 61/821,909, filed on May 10, 2013. These applications are hereby incorporated by reference herein.

The following generally relates to direct conversion radiation detectors and more particularly to direct conversion radiation detector digital signal processing electronics, and is described with particular application to computed tomography (CT). However, the following is also amenable to X-ray, nuclear medicine, and/or other modalities employing direct conversion detectors.

A CT scanner generally includes an x-ray tube mounted on a rotatable gantry opposite a detector array located across an examination region. The rotatable gantry, and hence the x-ray tube, rotates around the examination region, and the x-ray tube emits radiation that traverses the examination region. The detector array, which includes a one or two dimensional array of detector pixels, detects the radiation and generates signals indicative of the detected radiation. The signals are reconstructed to generate volumetric image data, and the volumetric image data can be processed to generate one or more images.

The detector array has included direct conversion detectors, which include a direct conversion material such as CdTe or Cd(Zn)Te . . . with detector pixels attached thereto. With direct conversion, incident radiation is converted directly to a charge signal indicative of the energy of the radiation. The performance of a direct conversion photon counting detector, in general, is better for smaller pixel sizes, relative to larger pixel sizes. For example, a smaller size pixel may have a reduced pixel count rate and be less susceptible to pulse pile-up, relative to a larger size pixel.

However, as the pixel size diminishes, performance is degraded by increased splitting of signals between two or more pixels. This occurs, for instance, when a photon is incident at the gap between pixels or at least not at the center of a pixel. In this instance, each of the pixels will receive a sub-portion of the charge signal and will register x-ray photons with only a part of the full energy, resulting in spectral degradation. In practice, there would have to be a compromise in the size of the pixels to balance the benefit of reduced pixel count rate and pulse pile-up against that of splitting signals.

One approach to reducing the spectral degradation is to combine signals from two or more pixels. Combining all neighboring signals above a trigger threshold (i.e., above the noise floor) may improve the spectrum. Unfortunately, this approach causes variable losses corresponding to the portions of the signals below threshold, and correcting the total signal for these losses adds noise and limits the accuracy of this approach. Combining all neighboring signals without thresholding can also recover the signal. Unfortunately, this approach adds noise from the increased number of pixels.

Aspects described herein address the above-referenced problems and others.

The following describes an approach for correcting for split signals in connection with direct conversion photon counting detectors. As described in greater detail below, in one instance, this includes identifying two or more pixels with coincident detections using digital signal processing and combining pixels values of the identified pixels.

In one aspect, a system includes a photon counting detector array including a direct conversion material and a plurality of detector pixels affixed thereto, and a split signal corrector that corrects the output of the plurality of detector pixels for split signals.

In another aspect, a method includes receiving an output signal of each of a plurality of detector pixels affixed to a direction conversion material of photon counting detector array, and correcting the output of the plurality of detector pixels for split signals.

In another aspect, a computer readable storage medium encoded with computer readable instructions, which, when executed by a processer, cause the processor to: receive an output signal of each of a plurality of detector pixels affixed to a direction conversion material of photon counting detector array, and correct the output of the plurality of detector pixels for split signals The invention may take form in various components and arrangements of components, and in various steps and arrangements of steps. The drawings are only for purposes of illustrating the preferred embodiments and are not to be construed as limiting the invention.

Figure 1:
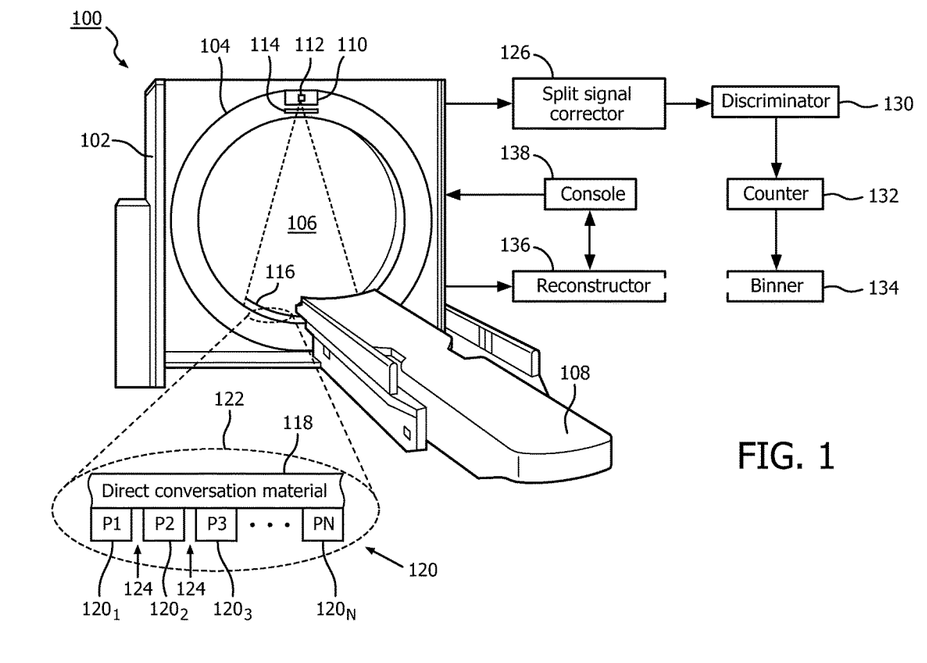
FIG. 1 schematically illustrates an example imaging system in connection with a (direction conversion photon counting detector) split signal corrector.

Initially referring to FIG. 1, an imaging system 100 such as a computed tomography (CT) scanner is schematically illustrated.

The imaging system 100 includes a stationary gantry 102 and a rotating gantry 104, which is rotatably supported by the stationary gantry 102. The rotating gantry 104 rotates around an examination region 106 about a longitudinal or z-axis. A subject support 108, such as a couch, supports an object or subject in the examination region 106. The subject support 108 can be used to vertically and/or horizontally position the subject or object relative to the imaging system 100 before, during, and/or after scanning.

A radiation source 110, such as an x-ray tube, is supported by and rotates with the rotating gantry 104 around the examination region 106 about the longitudinal or z-axis and emits x-ray radiation. A source collimator 114 collimates radiation emitted in the direction of the examination region 106, producing a beam 116 having a pre-determined geometrical shape of interest, such as a fan, a cone, a wedge, or other shaped beam that traverses the examination region 106.

A detector array 116 subtends an angular arc opposite the examination region 106 relative to the radiation source 110. The detector array 116 is a pixelated monolithic direct conversion photon counting detector that includes a direct conversion detector material 118 (e.g., CdTe, CdZnTe, Si, Ge, GaAs, and/or other direct conversion materials) and a one or two dimensional array of detector pixels 120 affixed thereto. A sub-portion 122 of the detector array 116 illustrates pixels $120_1$, $120_2$, $120_3$, . . . , $102_N$, where N is a positive integer, with gaps 124 there between. An amplifier may be used to amplify the output signals.

The direct conversion detector material 118 converts an incident x-ray photon directly into a charge signal indicative of the energy of the photon. The charge signal is gathered and received by one or more of the pixels 120. For instance, a single pixel may receive all or approximately all of the charge signal (e.g., when the photon is incident at a location at a center of a pixel) or two or more of the neighboring pixels may each receive a sub-portion of the charge signal (e.g., when the photon is incident at a location other than the center).

Each pixel outputs an analog electrical signal indicative of an energy corresponding to the charge signal (where approximately all of the charge is received by the pixel) or an energy corresponding the sub-portion of the charge signal it received (where the charge signal spreads over multiple pixels). As utilized herein, the term "split signal" refers to the latter instance where sub-portions of the charge signal are received by two or more neighboring pixels 120, such as pixels $120_1$ and $120_2$. The pixel outputs are amplified and shaped to give detector outputs by analog amplifiers that are on ASICs located close to the pixels: one amplifier channel for each pixel. Many amplifier channels may be on an ASIC.

A split signal corrector 126 corrects the output signals of the detector array 116 for split signals. As described in greater detail below, the split signal corrector 126 corrects for split signals in the digital domain. This approach mitigates signal losses associated with analog domain approaches. The split signal corrector 126 can be implemented via a hardware processor (e.g., a central processing unit, or CPU or ASIC or FPGA) executing one or more computer readable instructions encoded or embedded on computer readable storage medium (not including transitory medium), such as a physical memory device.

A counter 132 increments a count value for each threshold based on the output of the discriminator. For instance, when the output of a comparator for a particular threshold indicates that an amplitude of a pulse exceeds the corresponding threshold, the count value for that threshold is incremented. A binner 134 energy bins the counts based on a plurality of bins, each bin representing a different energy range. For example, a photon resulting in a count for the lower threshold but not for a next higher threshold, would be assigned to the lower threshold bin only. A photon with higher energy would be counted in both low and high threshold bins A reconstructor 136 reconstructs the energy-resolved signals. In one instance, this includes reconstructing Compton, photo-electric, and/or K-edge components, individually or in combination. From this, one or more anatomical (e.g., bone and soft tissue) and/or other material images (e.g., contrast agent) can be produced. A computer serves as an operator console 138. The console 146 includes a human readable output device such as a monitor or display and an input device such as a keyboard and mouse. Software resident on the console 138 allows the operator to interact with the scanner 100.

Figure 2:
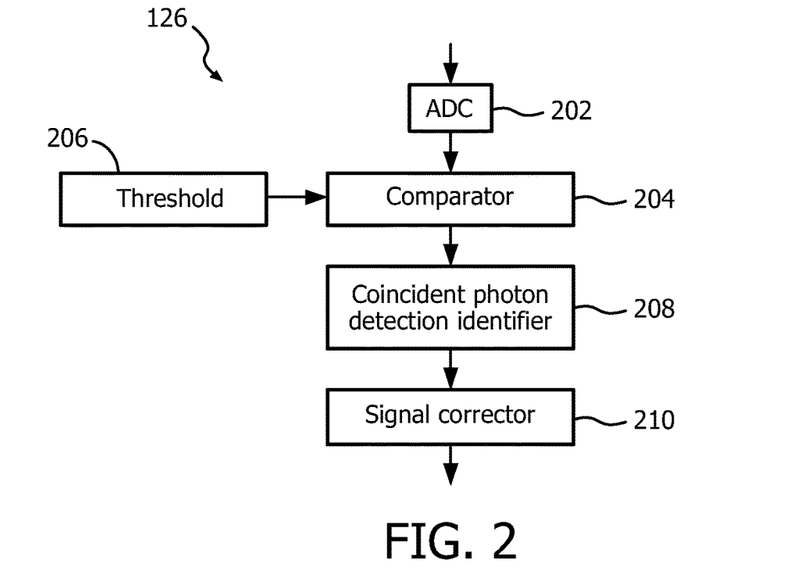
FIG. 2 schematically illustrates an example of the split signal corrector of FIG. 1.

FIG. 2 illustrates a non-limiting example of the split signal corrector 126.

An analog-to-digital converter (ADC) 202 converts an analog signal from a detector pixel 120 into a digital signal based on a predetermined sampling frequency. Although only a single ADC is shown in FIG. 2, it is to be understood that there may be an ADC for each of the detector pixels 120, for example, the ADC 202 may include a plurality of ADCs. The ADCs may be packaged together with the aforementioned analog amplifiers close to the pixels. The output of the ADC 202 is a digitized time trace for the pixel 120. The output signal can be stored in memory such as a buffer or otherwise.

A comparator 204 compares a magnitude of each of the digital samples in the digitized time trace with a predetermined threshold 206. Likewise, although only a single comparator is shown in FIG. 2, it is to be understood that there may be a comparator for each of the detector pixels 120, for example, the comparator 204 may include a plurality of sub-comparators. The threshold works by a predetermined algorithm that takes into account the global and local behavior of the original trace from the analog amplifier.

For instance, the comparator 204, in response to the digital sample having a value greater than the threshold, outputs a value (e.g., "1", "high", etc.) indicating the digital sample has a value greater than the threshold. In this instance, the comparator 204, in response to the digital sample having a value less than the threshold, outputs a value (e.g., "0", "low", etc.) indicating the digital sample has a value less than the threshold. The output may be used to toggle a bit between values to indicate whether a photon has been detected. The time of occurrence of the values greater than threshold are saved or made accessible.

A coincident photon detection identifier 208 identifies instances where neighboring pixels detect photons in a same time range (coincident detections) based on the output of the comparator 204. In one instance, this includes evaluating the output of the comparator 204 for each detector pixel to identify such neighboring pixels. Other approaches are also contemplated herein.

A signal corrector 210 only corrects samples that correspond to coincident detections. In one non-limiting instance, this includes summing or adding the values of neighboring pixels corresponding to coincident detections. The pixel value, for a coincident pair, with the larger magnitude is replaced with the sum and the other pixel value is set to zero. In this manner, the value for the pixel 120 that received the majority of the charge signal is corrected so that the value represents the entire or approximately the entire charge signal, and the neighboring pixel is deemed not to have received any of the charge signal.

The ADC 202, the comparator 204, the coincident photon detection identifier 208 and/or the signal corrector 210 can be part of a same component (e.g., an IC, an ASIC, a FPGA, etc.) and/or different ICs. Alternatively, at least one of the ADC 202, the comparator 204, the coincident photon detection identifier 208 or the signal corrector 210 is implemented through a computer.

Figure 3:
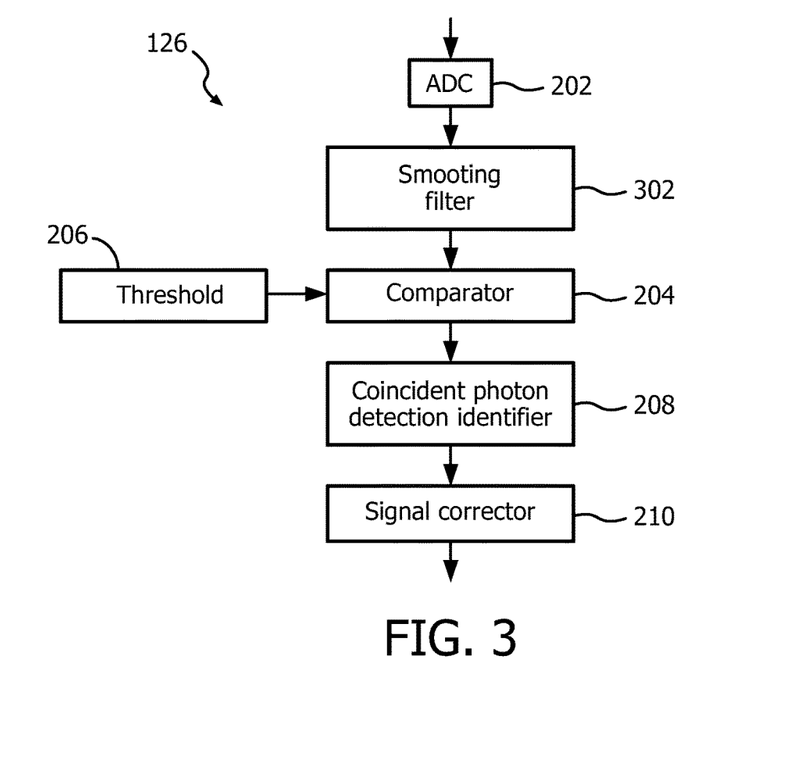
FIG. 3 schematically illustrates a variation of the example of the split signal corrector of FIG. 2 that further includes a digital signal smoothing filter or signal to noise enhancing filter.

FIG. 3 illustrates a variation of FIG. 2 in which a smoothing filter is employed after the A/D conversion and before coincidence detection. An example of a suitable smoothing filter is the so-called Savitzky-Golay smoothing filter, which performs a local polynomial regression on a series of the digital samples to determine smoothed values. Other digital domain smoothing filters are also contemplated herein.

Figure 4:
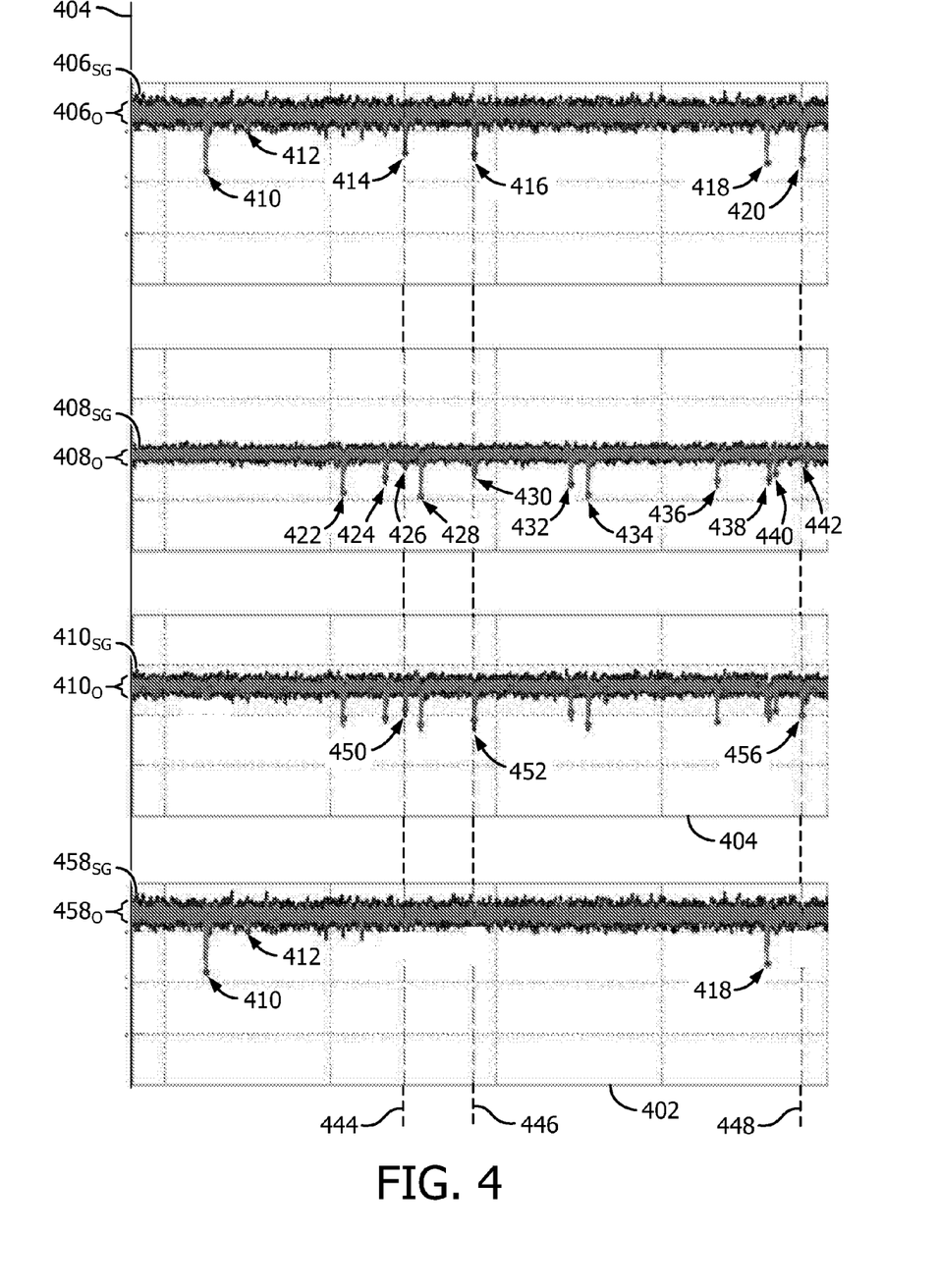
FIG. 4 schematically illustrates digitized detector output signals, including digitized output signals from neighboring pixels with coincident detection sample pairs and corrected signals as well as without coincident detection sample pairs.

FIG. 4 graphically shows simultaneous digital output signals of two neighboring pixels considered to have coincident detections (the top two curves), and the digital signals corrected for split signals (the bottom two curves). In FIG. 4, an x-axis 402 represents time and a y-axis 404 represents the output value.

A digital out signal $406_O$ represents the digital output signal of a first pixel (using the processing of FIG. 2), and a digital out signal $406_{SG}$ represents a smoothed digital output signal of the first pixel (using the processing of FIG. 3). A digital out signal $408_O$ represents the digital output signal of a second pixel (using the processing of FIG. 2), and a digital out signal $408_{SG}$ represents a smoothed digital output signal of the second pixel (using the processing of FIG. 3).

With respect to the digital out signal $406_{SG}$, the comparator 204 determines that digital samples 410, 412, 414, 416, 418, and 420 correspond to detected photons. With respect to the digital out signal $408_{SG}$, the comparator 204 determines that digital samples 422, 424, 426, 428, 432, 434, 436, 438, 440 and 442 correspond to detected photons. Samples 412 and 442 represent samples within the noise floor of the digital out signals $406_O$ and $408_O$, but outside of the noise floor of the smoothed digital out signals $406_{SG}$ and $408_{SG}$.

The coincident photon detection identifier 208 has identified photon detection 414 of the digital out signal $406_{SG}$ and photon detection 426 of the digital out signal $408_{SG}$ as occurring within a same time window 444 and thus coincident detections. Photon detections 416 and 430 and photon detections 420 and 442 of the digital out signals $406_{SG}$ and $408_{SG}$ have been identified as occurring within a same time window 446 and a same time window 448 and thus coincident detections.

With respect to the digital out signals $410_O$ and $410_{SG}$, the digital samples include the digital out signals $410_O$ and $410_{SG}$ where samples 428, 430, and 442 were replaced with samples 450 (sample 414+sample 426), 452 (sample 416+ sample 430) and 456 (sample 420+sample 442). Digital out signals $458_O$ and $458_{SG}$ include the digital samples of digital out signals $406_O$ and $406_{SG}$ with samples representing coincident photon detections (414, 416, and 420) removed.

Sample 412, which represents a sample within the noise floor of the digital out signal $406_O$, but outside of the noise floor of the smoothed digital out signal $406_{SG}$, is not identified as a coincident detection, or, an unsplit signal. Thus, the smoothing operation may also improve the quality and recognition of unsplit signals.

Figure 5:
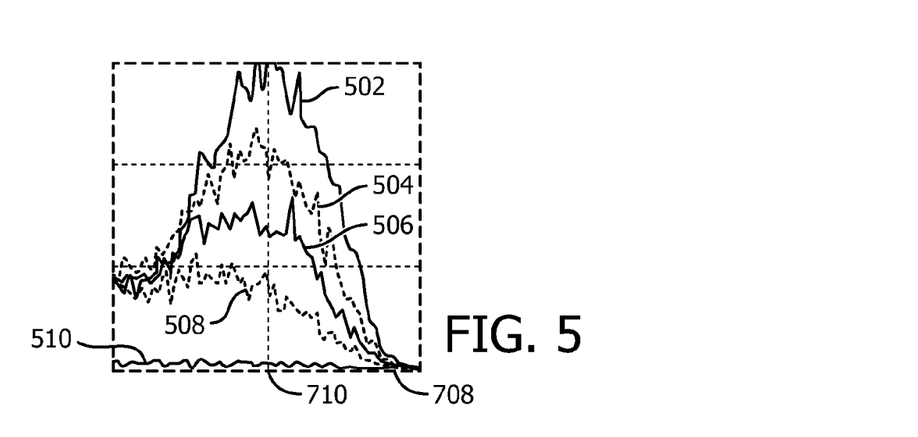
FIG. 5 schematically illustrates a variation in pulse height spectra as a function of location of a radiation beam in connection with a first of two neighboring pixels.
Figure 6:
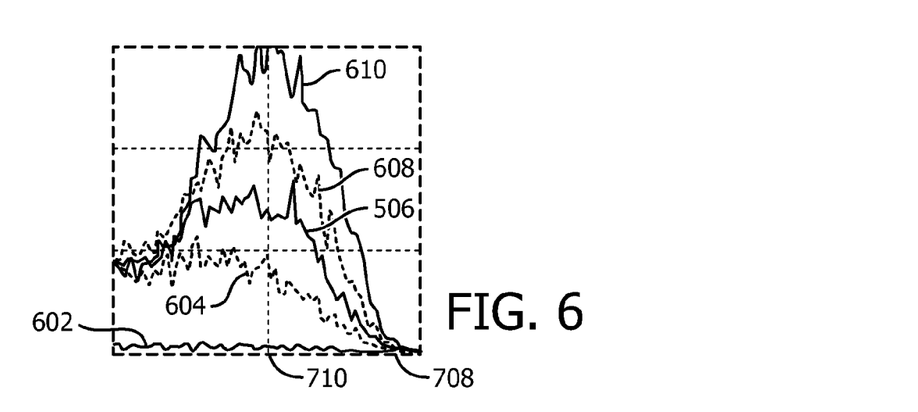
FIG. 6 schematically illustrates a variation in pulse height spectra as a function of location of a radiation beam in connection with a second of two neighboring pixels of FIG. 5.

FIGS. 5 and 6 respectively show digital output signals of the two neighboring pixels of FIG. 4 as a function of the location of a radiation beam. Signals 502 and 602 show digital output spectra where the radiation beam is incident at about a center region of a first of the neighboring pixels. In this instance, the first pixel sees most of the charge signals, which is indicated by the relative amplitude of the two peaks seen.

Peak signals 504 and 604 show digital output peaks signal where the radiation beam is incident between the center region of the first pixel and the gap between the pixels. The first pixel sees less of the full charge signal than before, but still most of the charge signal, and so the peak is reduced over signal 502. Signals 506 and 606 show digital output signals where the radiation beam is incident at about the gap between the pixels. In this instance, both pixels see about the same amount of full charge signals.

Signals 508 and 608 show digital output signals where the radiation beam is incident between the center region of the second pixel and the gap between the pixels. Now the second pixel sees more full charge signals than the first pixel. Signals 510 and 610 show digital output signals where the radiation beam is incident at about the center region of a second pixel, which sees most of the full charge signals.

In usual practice the location of the absorption of the incident x-ray is determined by the center of the single hit pixel. Two or more split signals in pixels with positions p1, p2, . . . and with signals s1, s2, . . . can be used to determine a more accurate position by interpolation: $p=(s1 \cdot p1+s2 \cdot p2+ \ldots )/(S1+s2+ \ldots )$. The more accurate position can be used to improve the image quality.

Figure 7:
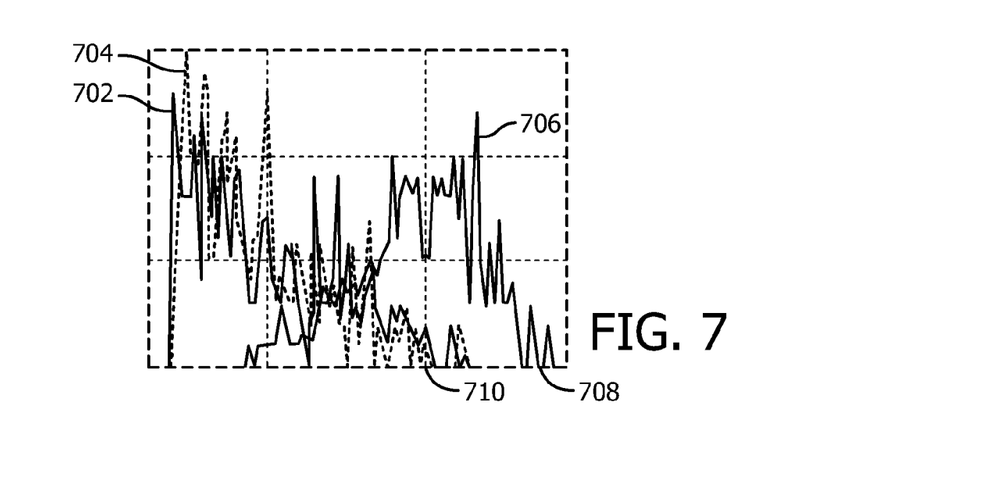
FIG. 7 schematically illustrates pulse height spectra for split signals taken by themselves and also combined.

FIG. 7 shows pulse height spectra of the coincident split pulses of FIG. 5 taken by themselves as singles 702 and 704 and together as a summation 706. In FIGS. 5, 6 and 7, an x-axis 708 represents the threshold energy, and the peaks of the signals 502, 610 and 706 are all about a threshold value 710, which shows that the summation of the values of the pixels for the coincident detection can, at least in this instance, be used to correct the digital signal to recover the energy without losses.

Figure 8:
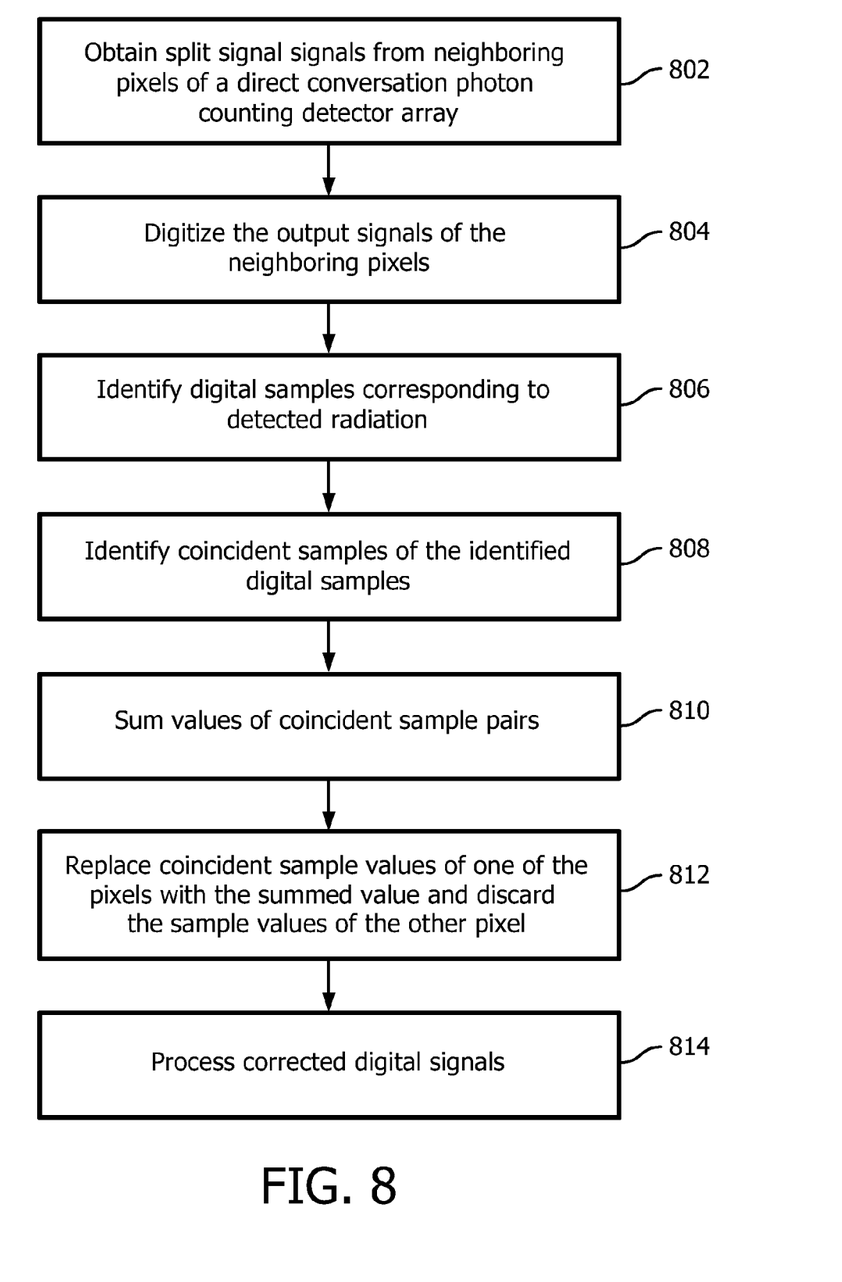
FIG. 8 illustrates example method for correcting for split signals in connection with direct conversion photon counting detectors.

FIG. 8 illustrates example method for correcting for split signals in connection with direction conversion photon counting detectors.

It is to be appreciated that the ordering of the acts of these methods is not limiting. As such, other orderings are contemplated herein. In addition, one or more acts may be omitted and/or one or more additional acts may be included.

At 802, x-ray radiation is received by a direct conversion photon counting detector array of an imaging system during a scan of an object or subject, wherein a charge signal produced by a direct conversion material thereof is spread over and received by neighboring detector pixels of the detector array.

At 804, a first output signal of a first of the neighboring pixels is digitized, creating a first digitized output signal, and a second output signal of a second of the neighboring pixels is digitized, creating a second digitized output signal.

At 806, the digital samples of the first and the second output signal are compared with a predetermined energy threshold to identify which of the samples correspond to detected radiation.

At 808, digital samples of the first and second output signals identified as corresponding to detected radiation that occur within a same predetermined time window are identified as coincident detections.

At 810, each pair of the sample values of the first and second output signals identified as coincident detections are summed.

At 812, the sample values corresponding to coincident detections of one of the first or second output signals are replaced with the summation, and the sample values corresponding to coincident detections of the other one of the first or second output signals are discarded, correcting both signals At 814, the corrected signals are further processed, for example, energy-resolved and reconstructed.

The above acts may be implemented by way of computer readable instructions, encoded or embedded on computer readable storage medium (i.e., physical memory and other non-transitory medium), which, when executed by a microprocessor(s), cause the processor(s) to carry out the described acts. Additionally or alternatively, at least one of the computer readable instructions is carried by a signal, carrier wave and other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A system, comprising:
   a photon counting detector array configured with a direct conversion material and a plurality of detector pixels affixed thereto; and
   a split signal corrector configured to correct an output of the plurality of detector pixels for split signals, wherein the split signals comprise a first signal from one of the plurality of detector pixels indicative of a first sub-portion of a charge signal generated by direct conversion material in response to an incident photon and a second signal from at least another one of the plurality of detector pixels indicative of a second sub-portion of the same charge signal of the same incident photon, wherein a corrected first signal of the output comprises a sum of digital samples of the first signal and the second signal.

2. The system of claim 1, the split signal corrector, comprising:
   an analog-to-digital converter configured to convert the analog output signal of a pixel into a digital time series signal, wherein the split signal corrector corrects digital samples in the digital time series signal for split signals.

3. The system of claim 2, the split signal corrector, further comprising:
   a comparator configured to compare a value of each of the samples in each of the digital time series signals with a predetermined energy threshold and identifies samples as corresponding to detected photons in response to the value exceeding the energy threshold, wherein the split signal corrector corrects digital samples in the digital time series signal that correspond to detected photons.

4. The system of claim 3, wherein an energy threshold for a pixel is determined based on a global and a local behavior of the analog output signal of the pixel.

5. The system of claim 4, the split signal corrector, further comprising:
   a smoothing filter configured to smooth the digital time series signal prior to further processing and increases the true signal to noise ratio.

6. The system of claim 5, wherein the smoothing facilitates identifying samples to correspond to detector photons.

7. The system of claim 3, the split signal corrector, further comprising:
   a coincident photon detection identifier configured to identify samples corresponding to detected photons in neighboring pixels that occur in a same time range.

8. The system of claim 7, the split signal corrector, further comprising:
   a signal corrector configured to correct only the samples identified as samples corresponding to detected photons in the neighboring pixels that occur in the same time range.

9. The system of claim 1, wherein the digital sample of the first signal is a larger magnitude than the digital sample of second signal.

10. The system of claim 1, wherein the digital sample of the second signal is a lower magnitude than digital sample of the first signal, wherein the split signal corrector corrects the digital sample of the second signal by discarding the digital sample of the second signal.

11. A method, comprising:
    receiving an output signal of each of a plurality of detector pixels affixed to a direction conversion material of photon counting detector array; and
    correcting the output signal of the plurality of detector pixels for split signals, wherein the split signals comprise a first signal from one of the plurality of detector pixels indicative of a first sub-portion of a charge signal generated by direct conversion material in response to an incident photon and a second signal from at least another one of the plurality of detector pixels indicative of a second sub-portion of the same charge signal of the same incident photon, wherein a corrected first signal of the output signal of the plurality of detect pixels comprises a sum of digital samples of the first signal and the second signal.

12. The method of claim 11, further comprising:
    converting an analog output signal of a pixel into a digital time series signal, wherein the split signal corrector corrects digital samples in the digital time series signal for split signals.

13. The method of claim 12, further comprising:
    smoothing the digital time series signal to increase the true signal to noise ratio prior to further processing.

14. The method of claim 13, wherein the smoothing facilitates identifying samples to correspond to detector photons.

15. The method of claim 12, further comprising:
    comparing a value of each of the samples in each of the digital time series signals with a predetermined energy threshold; and
    identifying samples as corresponding to detected photons in response to the value exceeding the energy threshold.

16. The method of claim 15, further comprising:
    determining an energy threshold for a pixel based on a global and a local behavior of the analog output signal of the pixel.

17. The method of claim 15, further comprising:
    identifying samples corresponding to detected photons in neighboring pixels that occur in a same time range.

18. The method of claim 17, further comprising:
    correcting only the samples identified as samples corresponding to detected photons in the neighboring pixels that occur in the same time range.

19. The method of claim 18, further comprising:
    determining a first magnitude of one of the samples of the neighboring pixels;
    determining a second magnitude of the other of the samples of the neighboring pixels;
    determining which of the first or second magnitude is larger; and
    wherein the digital sample of the first signal is the larger magnitude.

20. The method of claim 11, wherein a corrected second signal of the output comprises discarding the digital sample of the second signal, wherein a magnitude of the digital sample of the second signal is lower than a magnitude of the digital sample of the first signal.

21. A non-transitory computer readable storage medium encoded with computer readable instructions, which, when executed by a processor, cause the processor to:
    receive an output signal of each of a plurality of detector pixels affixed to a direction conversion material of photon counting detector array; and correct the output of the plurality of detector pixels for split signals, wherein the split signals comprise a first signal from one of the plurality of detector pixels indicative of a first sub-portion of a charge signal generated by the direct conversion material in response to an incident photon and a second signal from at least another one of the plurality of detector pixels indicative of a second sub-portion of the same charge signal of the same incident photon, wherein a corrected first signal of the output comprises a sum of digital samples of the first signal and the second signal.

* * * * *